United States Patent
Tsutsumi et al.

(10) Patent No.: US 8,619,336 B2
(45) Date of Patent: Dec. 31, 2013

(54) IMAGE PROCESSING APPARATUS AND METHOD AND NON-TRANSITORY COMPUTER-READABLE STORAGE MEDIUM STORING A COMPUTER-EXECUTABLE PROGRAM FOR CAUSING A COMPUTER TO PERFORM THE METHOD, FOR OUTPUTTING OR GENERATING A PULSE-WIDTH MODULATED SIGNAL

(75) Inventors: Takayuki Tsutsumi, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/941,582

(22) Filed: Nov. 8, 2010

(65) Prior Publication Data
US 2011/0116139 A1 May 19, 2011

(30) Foreign Application Priority Data

Nov. 16, 2009 (JP) .................................. 2009-261320

(51) Int. Cl.
*H04N 1/407* (2006.01)
(52) U.S. Cl.
USPC ............................ 358/3.26; 358/1.9; 358/3.27
(58) Field of Classification Search
None
See application file for complete search history.

(56) References Cited

U.S. PATENT DOCUMENTS

| | | | |
|---|---|---|---|
| 4,847,641 A | 7/1989 | Tung | |
| 5,115,241 A | 5/1992 | Ishikawa | |
| 5,134,495 A | 7/1992 | Frazier et al. | 358/298 |
| 5,436,981 A | 7/1995 | Ishikawa | |
| 5,532,828 A * | 7/1996 | Mitsuse | 358/3.15 |
| 5,646,670 A * | 7/1997 | Seto et al. | 347/131 |
| 5,875,044 A | 2/1999 | Seto et al. | |
| 6,084,984 A | 7/2000 | Ishikawa | |
| 6,192,152 B1 * | 2/2001 | Funada et al. | 382/199 |
| 6,683,702 B1 * | 1/2004 | Loce et al. | 358/3.09 |
| 6,791,713 B1 | 9/2004 | Takahashi et al. | |

(Continued)

FOREIGN PATENT DOCUMENTS

| | | |
|---|---|---|
| KR | 1994-0002484 | 3/1994 |
| KR | 0156956 B1 | 11/1998 |
| KR | 100910689 B1 | 8/2009 |

OTHER PUBLICATIONS

Korean Office Action dated Nov. 26, 2012, issued in counterpart Korean Application No. 10-2010-0112382.

(Continued)

*Primary Examiner* — Dung Tran
(74) *Attorney, Agent, or Firm* — Fitzpatrick, Cella, Harper & Scinto

(57) ABSTRACT

Directional data is generated representing a pattern that indicates a growing direction of a dot on a scanning line. Coefficients used to distribute the image data of a pixel of interest are set. An edge of an input image is detected. The image data of the pixel of interest of the input image is distributed to the interest pixel and a pixel adjacent to the interest pixel based on the coefficients. Image data distributed from the adjacent pixel is added to image data of the interest pixel on which the distribution is performed, and the sum of the image data is as corrected image data of the interest pixel. The corrected image data and the generated directional data are selected for an edge, and the image data of the interest pixel and input directional data are selected for a non-edge to generate an image signal pulse-width modulated.

19 Claims, 14 Drawing Sheets

(56) References Cited

U.S. PATENT DOCUMENTS

| | | | |
|---|---|---|---|
| 6,961,150 B2 * | 11/2005 | Okuyama | 358/3.12 |
| 7,355,757 B2 * | 4/2008 | Bhattacharjya | 358/3.27 |
| 7,432,985 B2 | 10/2008 | Ishikawa et al. | |
| 7,457,004 B2 * | 11/2008 | Asai et al. | 358/3.06 |
| 7,598,971 B2 | 10/2009 | Tezuka et al. | |
| 7,672,525 B2 | 3/2010 | Ishikawa | |
| 7,881,372 B2 | 2/2011 | Ishikawa | |
| 8,355,175 B2 * | 1/2013 | Noguchi | 358/2.1 |
| 8,406,295 B2 * | 3/2013 | Ishikawa | 375/240.03 |
| 2006/0290767 A1 | 12/2006 | Tezuka et al. | |
| 2008/0123141 A1 * | 5/2008 | Noguchi | 358/2.1 |
| 2008/0186541 A1 | 8/2008 | Takasaka et al. | |
| 2008/0266581 A1 | 10/2008 | Ishikawa et al. | |
| 2009/0027404 A1 | 1/2009 | Hara et al. | |
| 2009/0034861 A1 | 2/2009 | Nakagawa et al. | |
| 2009/0060390 A1 | 3/2009 | Hara et al. | |
| 2009/0097057 A1 | 4/2009 | Hosaki et al. | |
| 2009/0161954 A1 | 6/2009 | Inoue et al. | |
| 2010/0171970 A1 | 7/2010 | Takayama et al. | |

OTHER PUBLICATIONS

Concise explanation/translation of Korean Office Action dated Nov. 27, 2012, issued in Korean Application No. 10-2010-0112382.

Search Report issued in European Patent Application No. 101905534.7, dated Dec. 13, 2012.

U.S. Appl. No. 12/971,683, filed Dec. 17, 2010, Hisashi Ishikawa.

* cited by examiner

FIG. 4

| LINE POSITION | CORRECTION COEFFICIENT |
|---|---|
| 0 | 0.0 |
| 1 | 0.0 |
| ⋮ | ⋮ |
| 10 | 0 |
| 11 | 0.5 |
| 12 | 0.5 |
| 13 | 0 |
| ⋮ | ⋮ |
| 20 | 0 |
| 21 | -0.5 |
| 22 | -0.5 |
| 23 | 0 |
| ⋮ | ⋮ |
| n-2 | 0.0 |
| n-1 | 0.0 |

FIG. 7
| LINE POSITION | CORRECTION COEFFICIENT |
|---|---|
| K-1 | 0.5 |
| K | 0.5 |
| K+1 | 0 |
FIG. 8A
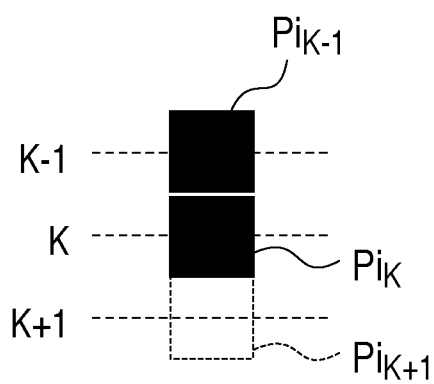
FIG. 8B
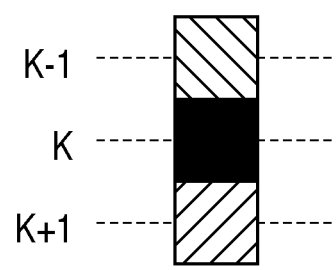

IMAGE PROCESSING APPARATUS AND METHOD AND NON-TRANSITORY COMPUTER-READABLE STORAGE MEDIUM STORING A COMPUTER-EXECUTABLE PROGRAM FOR CAUSING A COMPUTER TO PERFORM THE METHOD, FOR OUTPUTTING OR GENERATING A PULSE-WIDTH MODULATED SIGNAL

BACKGROUND OF THE INVENTION

1. Field of the Invention

The present invention relates to an image processing apparatus and image processing method and, for example, to an image processing apparatus and image processing method for outputting a pulse-width modulated signal to an image forming device using an electrophotographic method.

2. Description of the Related Art

An image forming device such as a copying machine or printer using an electrophotographic method charges a photosensitive drum, and causes a light beam to scan and expose the charged photosensitive drum, thereby forming an electrostatic latent image on the photosensitive drum. Then, the electrostatic latent image is developed by a color material (toner) so as to form a toner image. The toner image is transferred and fixed to a printing paper sheet, thereby forming a visible image on the printing paper sheet.

Such an image forming device uses various motors such as a motor for rotating the photosensitive drum. Hence, the output image degrades because of the influence of a fluctuation in the motor rotation speed, the eccentricity of a rotating shaft or gear, pitch error, and the like. For example, a vibration of the photosensitive drum or a fluctuation in the rotation speed during latent image formation makes the pitch of scanning lines fluctuate in a direction (the rotation direction of the photosensitive drum; to be referred to as a sub-scanning direction hereinafter) perpendicular to the laser beam scanning direction (to be referred to as a main scanning direction hereinafter). This fluctuation causes a density fluctuation called banding in an output image, resulting in a decrease in the output image quality.

U.S. Pat. No. 5,134,495 (patent reference 1) discloses one of the solutions to this problem. This method allows distributing of the density value of the dot of a pixel of interest to surrounding pixels in the sub-scanning direction, and thus shifting the position of each dot of the toner image in the sub-scanning direction.

The technique of patent reference 1 will be explained with reference to FIGS. 1A to 1E. FIG. 1A shows a state in which scanning lines K−1, K, and K+1 (K is an integer) are arranged in the sub-scanning direction, and a dot A is formed on the scanning line K−1. To help understanding the technique of patent reference 1, an example will be described in which, for example, the position of the dot A is shifted in the sub-scanning direction by a ½ pixel so as to correct pitch fluctuation.

FIG. 1B is a view schematically showing a pulse-width modulated (PWM) signal Sa corresponding to the dot A shown in FIG. 1A. Note that the pixel value of the dot A corresponds to 100% density (maximum value). In the technique of patent reference 1, to correct pitch fluctuation, each pixel value of the input image is distributed to pixels (to be referred to as adjacent pixels hereinafter) adjacent in a direction (to be referred to as a forward direction hereinafter) reverse to the rotation direction of the photosensitive drum in accordance with correction coefficients set in a table stored in the memory. For example, the pixel value of the dot A is distributed to pixels on the scanning lines K−1 and K in accordance with correction coefficients to generate PWM signals Sa1 and Sa2 shown in FIG. 1C. In the example of FIG. 1C, both the PWM signals Sa1 and Sa2 correspond to 50% density. Each of the PWM signals Sa1 and Sa2 is a signal pulse-width modulated to, for example, grow the pixel from the center of the pixel position.

FIG. 1D is a view showing laser irradiation after the pixel value distribution. The widths of rectangular regions La1 and La2 indicate the ranges of laser irradiations by the PWM signals Sa1 and Sa2. A region Ra represents the region of a latent image to be formed by laser irradiation according to the PWM signals Sa1 and Sat. A position D1 indicates the beginning end of one pixel; D2, the starting position of laser irradiations La1 and La2; D3, the end position of laser irradiations La1 and La2; and D4, the terminating end of one pixel. A latent image formed by the laser irradiation La1 and a latent image formed by the laser irradiation La2 are composited to form a latent image corresponding to the region Ra. When the latent image is developed, and a toner image is transferred and fixed, a dot A' shown in FIG. 1E is formed. The dot A' is shifted from the dot A by a ½ pixel in the forward direction (toward the scanning line K+1).

The technique of patent reference 1 can thus shift each dot position of a toner image in the sub-scanning direction, thereby correcting banding caused by pitch fluctuation. According to the technique of patent reference 1, a line formed from single dots or 1-dot width and running in the main scanning direction has high image quality after correcting pitch fluctuation. However, the width of a line of a 2-dot width or more extends after pitch fluctuation correction, resulting in poor image quality.

Image quality degradation that occurs in the technique of patent reference 1 will be described with reference to FIGS. 2A to 2E. FIG. 2A shows a state in which when banding has occurred, a line of a 2-dot width is then formed by two dots adjacent in the vertical direction. The dots A and B form a dot C that forms a line of a 2-dot width. Assume that the position of the line is shifted by a ½ pixel in the forward direction to correct pitch fluctuation. Both the dots A and B are assumed to have pixel values corresponding to 100% density (maximum value).

FIG. 2B shows PWM signals Sa1, Sab, and Sb2 generated by distributing the pixel values of the dots A and B to adjacent pixels in accordance with correction coefficients. The pixel value of the dot A is equally distributed to the pixels on the scanning lines K−1 and K. The pixel value of the dot B is equally distributed to the pixels on the scanning lines K and K+1. With this processing, the PWM signals Sa1 and Sb2 have values corresponding to 50% density, and the PWM signal Sab has a value corresponding to 100% density. Each of the PWM signals Sa1, Sab, and Sb2 is a signal pulse-width modulated to, for example, grow the pixel from the center of the pixel position.

FIG. 2C is a view showing laser irradiation after the pixel value distribution. The widths of the rectangular regions La1, Lab, and Lb2 indicate the ranges of laser irradiations by the PWM signals Sa1, Sab, and Sb2. The region Ra represents the region of a latent image to be formed by laser irradiation according to the PWM signal Sa1. A region Rab represents the region of a latent image to be formed by laser irradiation according to the PWM signal Sab. A region Rb represents the region of a latent image to be formed by laser irradiation according to the PWM signal Sb2. Note that the positions D1 to D4 are the same as in FIG. 1D.

When laser irradiation is performed as shown in FIG. 2C, a composite of the latent images formed by the laser irradiations La1, Lab, and Lb2, that is, a latent image corresponding to the regions Ra, Rab, and Rb shown in FIG. 2C is formed. At this time, not a latent image corresponding to 100% density but a latent image corresponding to 150% density is formed in the overlap region of the regions Ra and Rab. Similarly, a latent image corresponding to 150% density is formed in the overlap region of the regions Rab and Rb as well. That is, the toner image has excess toner in the overlap regions.

FIG. 2D is a view schematically showing the toner image formed on the photosensitive drum. The toner image includes a toner image Ta formed by developing the latent image in the region Ra, a toner image Tc formed by developing the latent image in the non-overlap region of the region Rab, and a toner image Tb formed by developing the latent image in the region Rb. Since excess toner exists in the above-described overlap region, dots of toner spread in the sub-scanning direction are formed by the toner images Ta and Tb, as compared to an image without the overlap region. Note that since a line is formed by the toner images Ta and Tb arranged in the main scanning direction, the toner images spread not in the main scanning direction with a high toner density, but in the sub-scanning direction with a low toner density, although not illustrated. As a result, a dot C', thicker (for example, 3-dot width) than the original dot C of the 2-dot width is formed, as shown in FIG. 2E, resulting in a fattened line. According to the patent reference 1, the sharpness of the line is decreased.

SUMMARY OF THE INVENTION

According to one, an image processing apparatus for outputting an image signal to an image forming device which uses an electrophotographic method, comprising: a generator, configured to generate directional data representing a pattern which indicates a growing direction of a dot on a scanning line and in which the growing direction changes every predetermined number of scanning lines; a setting section, configured to set correction coefficients to be used to distribute image data of a pixel of interest to the pixel of interest and an adjacent pixel adjacent to the pixel of interest in a sub-scanning direction; a detector, configured to detect an edge portion of an image represented by input image data; a distributor, configured to distribute the image data of the pixel of interest of the input image data to the pixel of interest and the adjacent pixel in accordance with the correction coefficient; a corrector, configured to add image data distributed from the adjacent pixel to image data of the pixel of interest on which the distribution is performed, and to output the sum of the image data as corrected image data of the pixel of interest; an selector, configured to select the corrected image data of the pixel of interest and the generated directional data for an edge portion of the image, and to select the image data of the pixel of interest and input directional data supplied together with the input image data for a non-edge portion of the image; and a pulse-width modulator, configured to generate an image signal pulse-width modulated using the image data of the pixel of interest and the directional data selected by the selector, and to output the image signal to the image forming device.

According to the aspect, it is possible to correct banding while preventing extension of the width of a line formed by an image forming device.

Further features of the present invention will become apparent from the following description of exemplary embodiments with reference to the attached drawings.

BRIEF DESCRIPTION OF THE DRAWINGS

FIG. 4 is a view for explaining an example of a correction coefficient table generated by a correction coefficient generator.

FIG. 7 is a view showing an example of the correction coefficient table.

FIGS. 8A and 8B are views for explaining generated image data.

DESCRIPTION OF THE EMBODIMENTS

An image processing apparatus and image processing method according to the present invention will now be described in detail with reference to the accompanying drawings.

First Embodiment

[Arrangement of Apparatus]

Figure 1A:
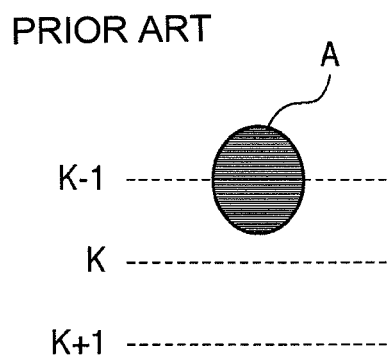
FIGS. 1A to 1E are views for explaining the technique of patent reference 1.
Figure 1B:
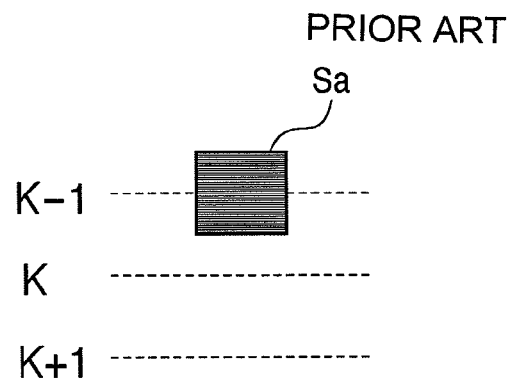
Figure 1C:
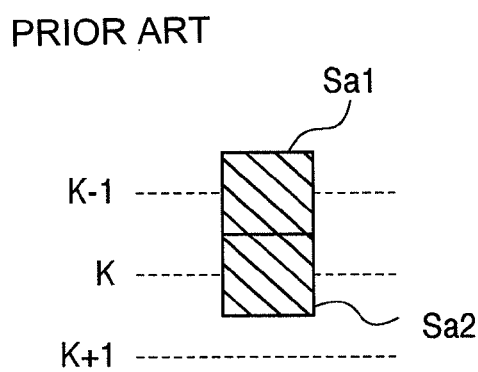
Figure 1D:
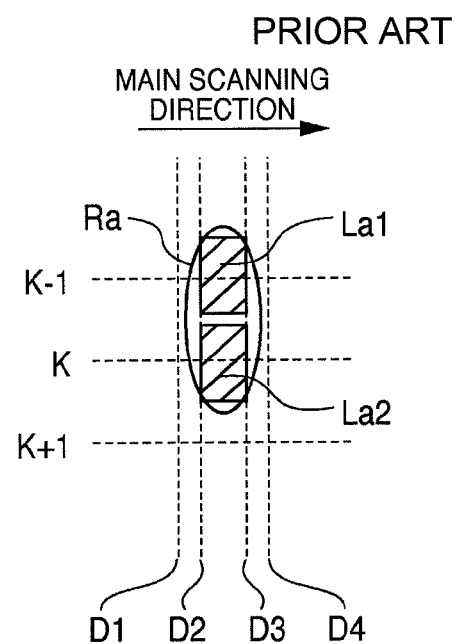
Figure 1E:
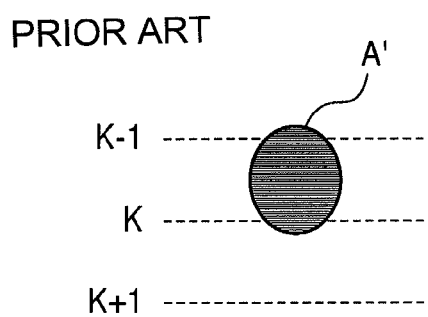
Figure 2A:
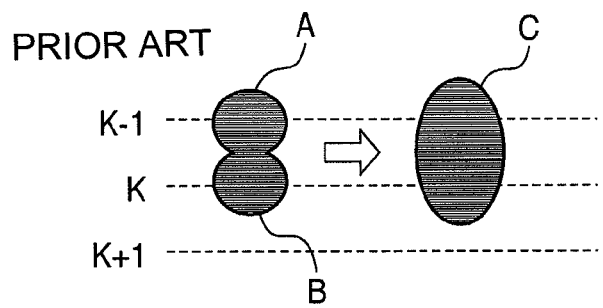
FIGS. 2A to 2E are views for explaining image degradation in the technique of patent reference 1.
Figure 2B:
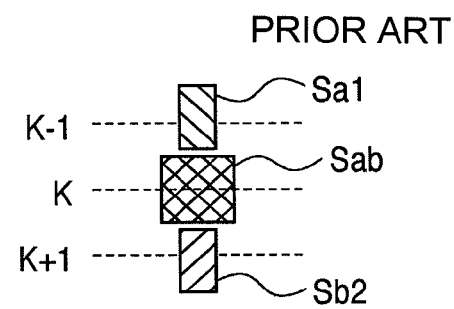
Figure 2C:
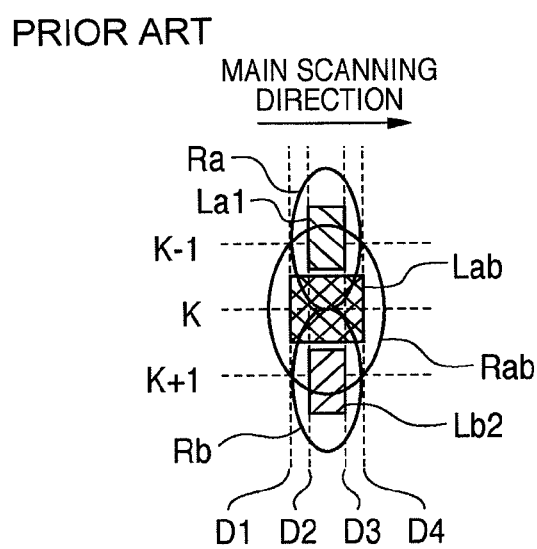
Figure 2D:
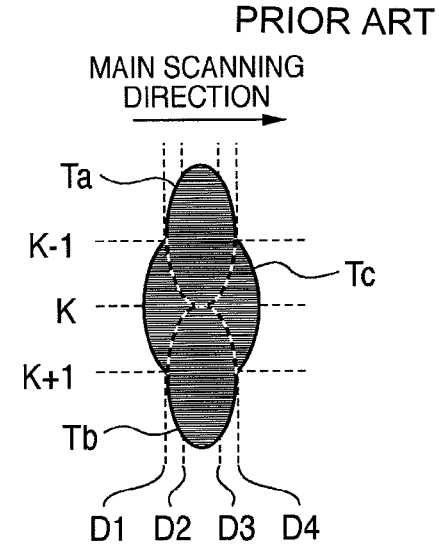
Figure 2E:
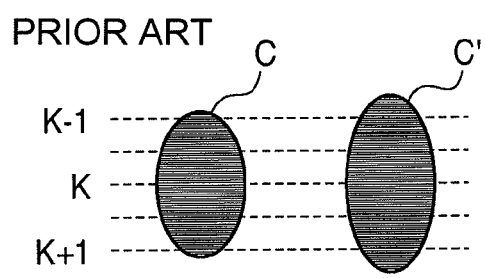
Figure 3:
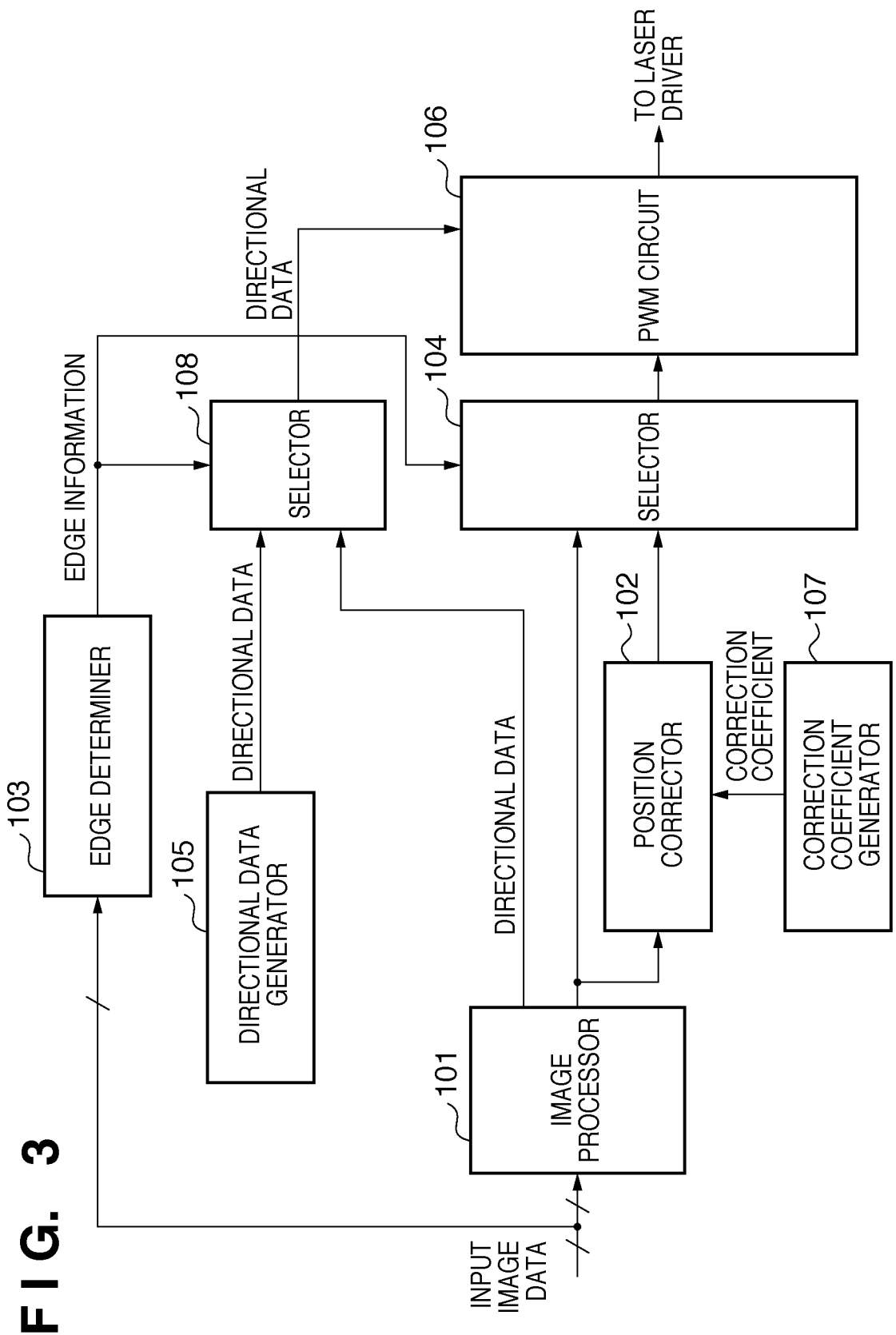
FIG. 3 is a block diagram for explaining the arrangement of an image processing apparatus according to an embodiment.

The arrangement of an image processing apparatus according to the embodiment will be described with reference to the block diagram of FIG. 3. The image processing apparatus comprises a memory for storing a correction coefficient table to be described later, a line memory for buffering image data of a plurality of scanning lines, a pixel clock for synchronizing processes of pixels, and the like. The existence of the memories and clock will be apparent to those skilled in the art from the following description, and a description thereof will be omitted.

An image processor 101 converts the resolution (ppi) of input image data representing a density value into the printing density (dpi) of an image forming device. The image processor 101 also performs halftone processing of a multilevel image represented by the input image data so as to convert it into image data of fewer tones. For example, halftone processing by dither is executed using a dither matrix stored in a memory (not shown). Note that the number of tones of the image data output from the image processor 101 are expressible by a PWM circuit 106 to be described later.

In the image processor 101, for example, data (to be referred to as directional data hereinafter) representing the growing direction of a dot is set for each cell of the dither matrix. For example, in a dot-concentrated dither matrix, directional data to grow a dot from the center of the pixel position is set. If there are adjacent dots on the left and right sides of a pixel of interest, directional data to grow the dot of the pixel of interest from the side of the left or right adjacent pixel having a larger pixel value may be set. Alternatively, in a dot-dispersed dither matrix, directional data to grow a dot from the beginning or terminating edge of the pixel position in one direction is set. The directional data held by the image processor 101 can arbitrarily be set in accordance with the dither matrix size, a threshold, a laser characteristic, or the like.

In other embodiments error diffusion may be used instead of a dither matrix for halftone processing. When the error diffusion method is used, dots are dispersed. Hence, directional data is preferably set such that all dots grow in the same direction.

A correction coefficient generator 107 sets, based on the deviation amount of each scanning line generated by a pitch fluctuation or the like, a distribution ratio to distribute the pixel value of a pixel of interest to a pixel (to be referred to as an upper or lower adjacent pixel hereinafter) adjacent to a scanning line above or below the scanning line (to be referred to as a scanning line of interest hereinafter) on which the pixel of interest is located. Details will be described later. Calculated distribution ratios are stored in a correction coefficient table on the memory (not shown).

A position corrector 102 receives the image data output from the image processor 101. The position corrector 102 distributes the value of a pixel of interest to the pixel of interest and upper and lower adjacent pixels by looking up the correction coefficient table. Details will be described later. The position corrector 102 outputs corrected image data obtained by compositing the distributed pixel values for each pixel.

An edge determiner 103 detects an edge of the input image from the input image data, and outputs edge information representing whether a pixel forms an edge. Edge detection can be done using, for example, a method of determining whether a pixel corresponds to an edge by comparing each pixel value of an edge image formed by second order derivative of the input image with a threshold, or a method of determining, based on the difference value between a pixel of interest and a surrounding pixel, whether the pixel of interest is present on an edge. Note that the edge information is 1-bit information. For example, "1" represents a pixel of an edge portion, and "0" represents a pixel of a non-edge portion (flat portion).

A selector 104 selectively outputs the image data output from the image processor 101 or the image data output from the position corrector 102 in accordance with the edge information output from the edge determiner 103. When the edge information is "1" (edge portion), the selector 104 selects the image data output from the position corrector 102. When the edge information is "0" (flat portion), the selector 104 selects the image data output from the image processor 101.

A directional data generator 105 generates directional data having a growing pattern that changes the dot growing direction between the scanning line of the upper end of one line in the widthwise direction and the scanning line of the lower end. Details will be described later. For example, directional data for a line of 2-dot width has a growing pattern "right growth, right growth, left growth, left growth, right growth, . . ." for each scanning line. That is, the directional data changes the growing direction at a cycle (scanning line cycle) of two scanning lines. Note that the phrase "right growth" indicates that a dot grows from the right end to the left end of the pixel position, and the phrase "left growth" indicates that a dot grows from the left end to the right end of the pixel position.

A selector 108 selectively outputs directional data supplied by the image processor 101 together with the halftone-processed image data or the directional data generated by the directional data generator 105 in accordance with the edge information output from the edge determiner 103. When the edge information is "0" (flat portion), the selector 108 selects the directional data supplied by the image processor 101. When the edge information is "1" (edge portion), the selector 108 selects the directional data output from the directional data generator 105. Having the above structure, the selectors 104 and 108 select the corrected image data of the pixel of interest (output of the position corrector 102) and the generated directional data (output of the directional data generator 105) for an edge portion of the image, and select the image data of the pixel of interest and input directional data supplied together with the input image data (output of the image processor 101) for a non-edge portion of the image.

The PWM circuit 106 generates an image signal (PWM signal) pulse-width modulated in accordance with the directional data selectively output from the selector 108 and the image data selectively output from the selector 104. The PWM signal is sent to a laser driver that is provided in an image forming device using an electrophotographic method to control light emission of a laser element in accordance with the PWM signal.

[Correction Coefficient Generator]

An example of the correction coefficient table generated by the correction coefficient generator 107 will be described with reference to FIG. 4. The correction coefficient table has n correction coefficients corresponding to n scanning lines 0 to n−1. A correction coefficient has a value ranging from −1 to +1. The absolute value of a correction coefficient represents a distribution ratio to distribute a pixel value to a pixel (to be referred to as an upper or lower adjacent pixel hereinafter) adjacent on the upper or lower side. The sign of a correction coefficient represents an upper or lower adjacent pixel to which a pixel value is distributed. For example, for a pixel of interest of a scanning line K, a positive correction coefficient represents the distribution to the adjacent pixel of the succeeding scanning line (scanning line K+1). A negative correction coefficient represents the distribution to the adjacent pixel of the preceding scanning line (scanning line K−1).

Equation (1) is an expression of a distributed pixel value Pk, and equation (2) is an expression of a value Pk' distributed to an upper or lower adjacent pixel.

$$Pk = (1 - |Cc|) \times Pi \quad (1)$$

$$Pk' = |Cc| \times Pi \quad (2)$$

where Pi is a pixel value to be distributed,

Pk is the distributed pixel value,

Pk' is the value distributed to an upper or lower adjacent pixel, and

Cc is a correction coefficient.

The number of correction coefficients Cc is the same as the number of scanning lines corresponding to the cycle of sub-scanning positional deviation, caused by a pitch fluctuation or the like, of the image to be formed by the image forming device. For example, when a pitch fluctuation has a cycle of N scanning lines, the correction coefficients Cc corresponding to N scanning lines are set. At this time, an address k and a scanning line n of interest in the correction coefficient table have a relation given by $$k = \mathrm{mod}(n+n0, N) \quad (3)$$

where n0 is the address of a scanning line position 0, n is the line position of a scanning line of interest, N is the number of scanning lines corresponding to the pitch fluctuation cycle, and mod(x,y) is the remainder function of x/y.

For example, when the line position n of the scanning line of interest is 41, the pitch fluctuation cycle N is 30, and the address n0 of line position 0 is 0, "11" is obtained as the address k of the correction coefficient table. Hence, Cc=+0.5 is obtained as the correction coefficient for the scanning line of interest by looking up the correction coefficient table shown in FIG. 4.

[Position Corrector]

Figure 5:
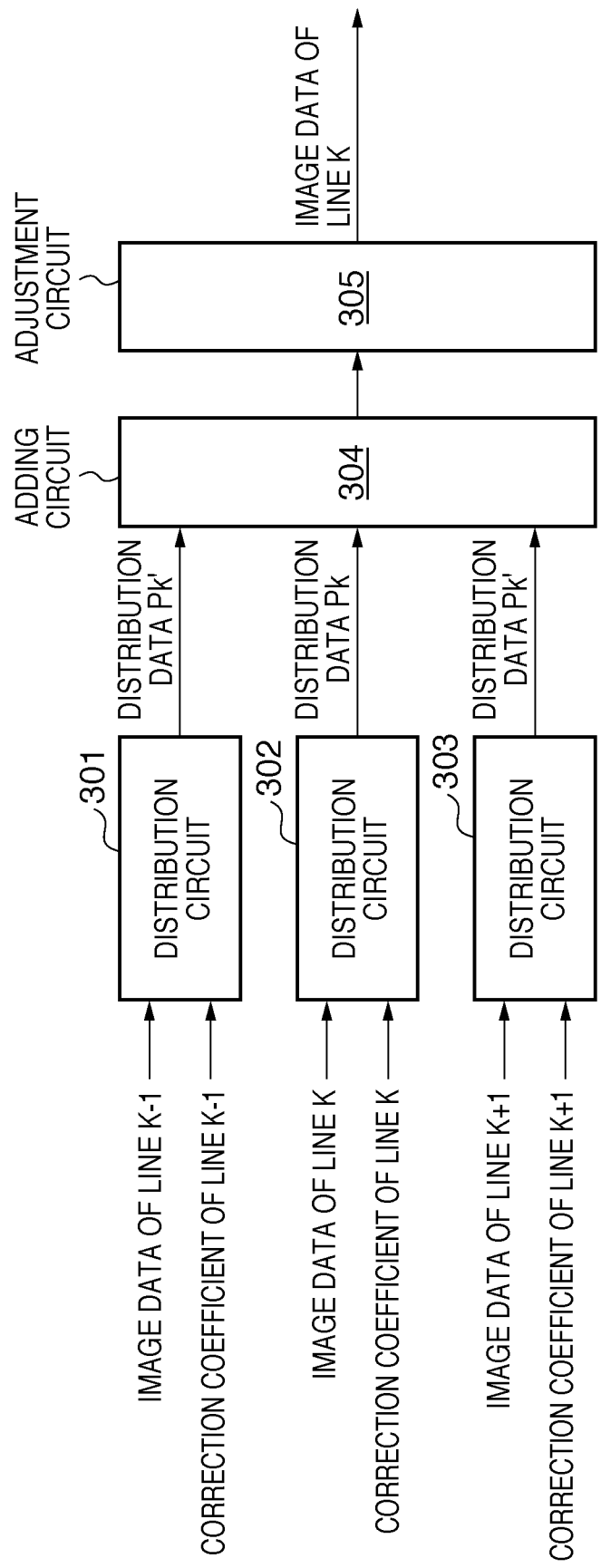
FIG. 5 is a block diagram for explaining the arrangement of a position corrector.

The arrangement of the position corrector 102 will be described with reference to FIG. 5. Note that the scanning line K is the scanning line of interest.

A distribution circuit 301 corresponding to the scanning line K−1 receives image data of the scanning line K−1 output from the image processor 101 and a correction coefficient $Cc_{K-1}$ of the scanning line K−1. If the correction coefficient $Cc_{K-1} \leq 0$ (distribution to the upper adjacent pixel), the distribution circuit 301 generates the distribution data Pk' from the pixel value Pi (=$P_{K-1}$) by equation (2). If the correction coefficient $Cc_{K-1} \leq 0$, the distribution circuit 301 generates the distribution data Pk' of value "0".

A distribution circuit 302 corresponding to the scanning line K of interest receives image data of the scanning line K output from the image processor 101 and a correction coefficient $Cc_K$ of the scanning line K. The distribution circuit 302 generates the distribution data Pk from the pixel value Pi (=$P_K$) by equation (1).

A distribution circuit 303 corresponding to the scanning line K+1 receives image data of the scanning line K+1 output from the image processor 101 and a correction coefficient $Cc_{K+1}$ of the scanning line K+1. If the correction coefficient $Cc_{K+1} < 0$ (distribution to the lower adjacent pixel), the distribution circuit 303 generates the distribution data Pk' from the pixel value Pi (=$P_{K+1}$) by equation (2). If the correction coefficient $Cc_{K+1} \geq 0$, the distribution circuit 303 generates the distribution data Pk' of value "0".

An adding circuit 304 receives the distribution data generated by the distribution circuits 301 to 303, and outputs the sum of the values as image data. An adjustment circuit 305 corrects the sum not to make the image data output from the adding circuit 304 exceed the maximum density. For example, when the image data output from the adding circuit 304 corresponds to a density more than 100%, the data is corrected to 100% density. Image data corresponding to a density of 100% or less is directly output.

Figure 6:
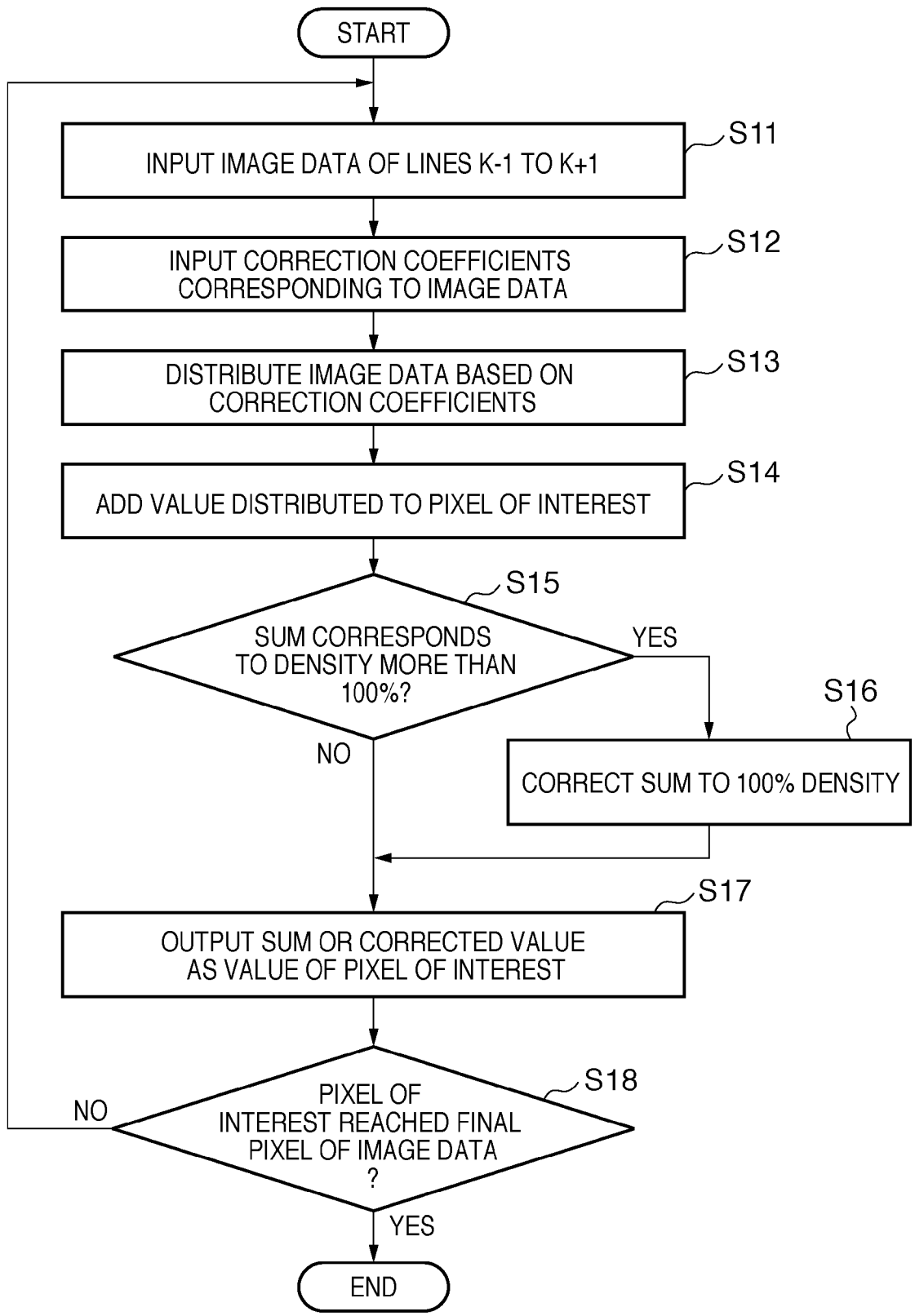
FIG. 6 is a flowchart for explaining processing of the position corrector.

Processing of the position corrector 102 will be described with reference to the flowchart of FIG. 6. For descriptive convenience, assume that the adjacent pixel of the scanning line K−1 has the value $Pi_{K-1}$ corresponding to 100% density, the pixel of interest of the scanning line K has the value $Pi_K$ corresponding to 100% density, and the adjacent pixel of the scanning line K+1 has the value $Pi_{K+1}$ corresponding to 0% density.

FIG. 7 shows an example of the correction coefficient table. The correction coefficient table shown in FIG. 7 holds the correction coefficients Cc which shift a line of 2-dot width formed by image data of the scanning line K and image data of the scanning line K−1 by a ½ dot width in the sub-scanning direction (forward direction).

The position corrector 102 receives image data of the scanning lines K−1 to K+1 output from the image processor 101 (S11). The position corrector 102 also receives the correction coefficients $Cc_{K-1}$, $Cc_K$, and $Cc_{K+1}$ corresponding to the image data from the correction coefficient generator 107 (S12). The position corrector 102 distributes the image data Pi based on the correction coefficients Cc (S13). The values distributed from the image data $Pi_{K-1}$ and $Pi_K$ to the pixel of interest are given by $$Pk' = |Cc_{K-1}| \times 100 = 0.5 \times 100 = 50\%$$

$$Pk = (1 - |Cc_K|) \times 100 = 0.5 \times 100 = 50\%$$

Since $Cc_{K+1} = 0$, the value distributed from the image data $Pi_{K+1}$ to the pixel of interest is 0.

Next, the position corrector 102 adds the values distributed to the pixel of interest (S14), and determines whether the sum corresponds to a density more than 100% (S15). If the sum corresponds to a density more than 100%, the sum is adjusted to 100% density (S16). The sum or corrected value is output as the value of the pixel of interest (S17). In this example, image data corresponding to 100% density is output as the value of the pixel of interest. Until it is determined in step S18 that the pixel of interest has reached the final pixel of the image data, the position corrector 102 repeats steps S11 to S17. Having the above structure, the correction coefficient generator 107 sets correction coefficients to be used to distribute image data of a pixel of interest to the pixel of interest and an adjacent pixel in adjacent to the pixel of interest in a sub-scanning.

Generated image data will be described with reference to FIGS. 8A and 8B. FIG. 8A is a view schematically showing the image data received by the position corrector 102 in step S11. The image data $Pi_{K-1}$ and $Pi_K$ corresponding to 100% density are indicated by solid fills, and the image data $Pi_{K+1}$ corresponding to 0% is indicated by a broken line.

FIG. 8B is a view schematically showing the image data output in step S17. When the scanning line of interest moves to the scanning line K+1, the pixel of the scanning line K−1 distributes a value corresponding to 50% density to the scanning line K so as to have a value corresponding to 50% density. The pixel of the scanning line K receives the value corresponding to 50% density from the scanning line K−1, and distributes a value corresponding to 50% density to the scanning line K+1 so as to have a value corresponding to 100% density. The pixel of the scanning line K+1 receives the value corresponding to 50% density from the scanning line K so as to have a value corresponding to 50% density.

[Directional Data Generator]

Figure 9:
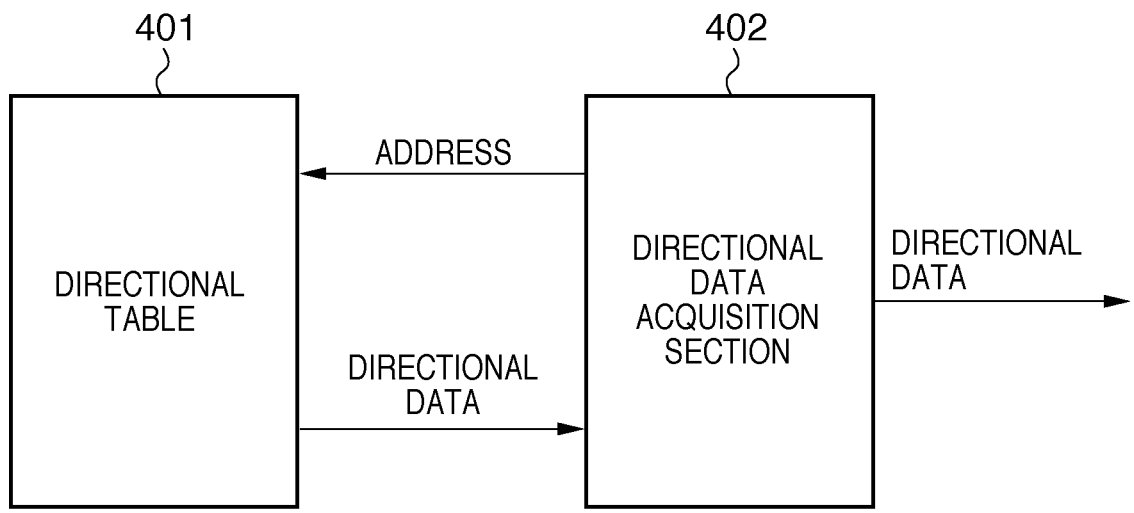
FIG. 9 is a block diagram for explaining the arrangement of a generator.

The arrangement of the directional data generator 105 will be described with reference to the block diagram of FIG. 9.

A directional table 401 holds, in a memory, directional data representing the growing directions of dots on a scanning line. As described above, directional data for a line of 2-dot width has a growing pattern "right growth, right growth, left growth, left growth, right growth, . . . . " That is, the directional data is set so as to make the growing directions of dots separated by two scanning lines different. The directional data stored in the directional table 401 will be explained with reference to FIG. 10. Directional data of the scanning line K−1 represents left growth (L). On the other hand, directional data of the scanning line K+1 separated by two scanning lines represents right growth (R).

A directional data acquisition section 402 outputs an address indicating a line position, reads out directional data corresponding to the address from the directional table 401, and outputs the readout directional data. An arbitrary method is usable for address generation. For example, a line counter representing a line position of an input image is used, and the count value of the line counter is output as an address. Having the above structure, the directional data generator 105 generates the directional data representing a pattern which indicates a growing direction (e.g. right or left) of a dot on a scanning line and in which the growing direction changes every predetermined number of scanning lines.

[PWM Circuit]

The PWM circuit 106 receives directional data selectively output from the selector 108 in accordance with edge information. Note that directional data preset in the image processor 101 will be referred to as "directional data A", and directional data generated by the directional data generator 105 will be referred to as "directional data B".

Relationships to be described below hold in combinations of image data and directional data input to the PWM circuit 106. For a flat portion, the directional data A and image data output from the image processor 101 are combined. For an edge portion, the directional data B and image data output from the position corrector 102 are combined. That is, for an edge portion where width of a line may be extended, the PWM circuit 106 receives image data corrected by the position corrector 102, and performs pulse width modulation using the image data and the directional data B. It is consequently possible to prevent the extension of width of a line of the edge portion even if it is shifted by a ½ dot width in the forward direction.

Figure 10:
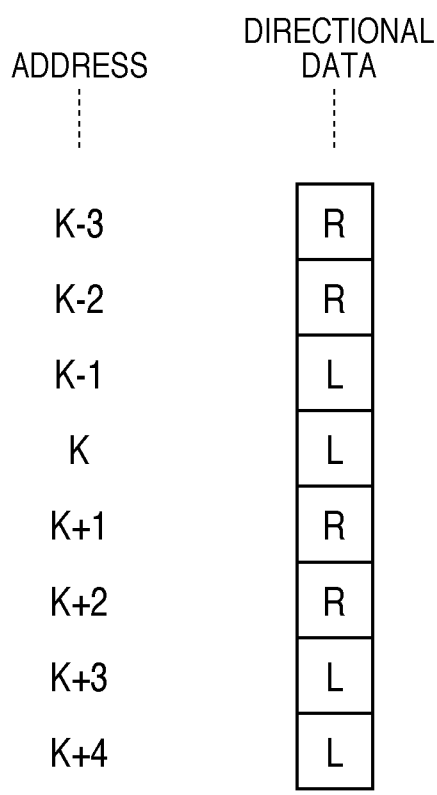
FIG. 10 is a view for explaining directional data stored in a directional table.

Formed dots will be described with reference to FIGS. 11A to 11D. Assume that the image data shown in FIG. 8B and the directional data shown in FIG. 10 are input to the PWM circuit 106. That is, left growth is set for the dots of the scanning lines K−1 and K, and right growth is set for the dot of the scanning line K+1. The PWM circuit 16 may use different reference signals based on the directional data. For example, when the directional data shows the right direction of dot growing, the reference triangle signal, whose center of gravity is relatively right, may be used, and when the directional data shows the left direction of dot growing, the reference triangle signal, whose center of gravity is relatively left, may be used.

Figure 11A:
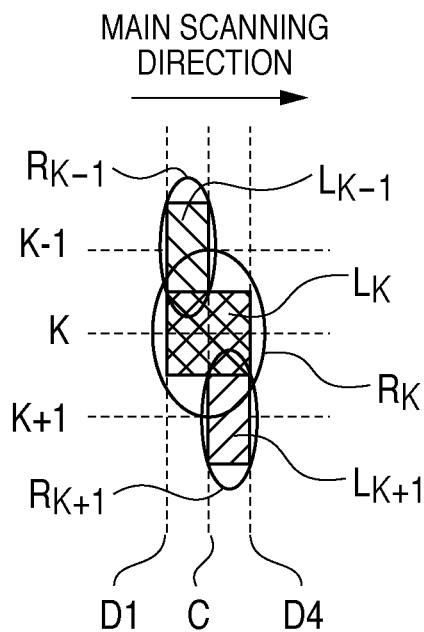
FIGS. 11A to 11D are views for explaining formed dots.

FIG. 11A is a view schematically showing laser irradiation. The widths of rectangular regions $L_{K-1}$, $L_K$, and $L_{K+1}$ indicate the ranges of laser irradiations by PWM signals obtained by pulse width modulation of the image data shown in FIG. 8B. Since image data of the scanning line K−1 corresponds to 50% density, and left growth is set for the scanning line K−1, laser irradiation is performed from a beginning end (left end) D1 of the pixel position to almost an intermediate point C. Since image data of the scanning line K corresponds to 100% density, and left growth is set for the scanning line K, laser irradiation is performed from the left end D1 of the pixel position to almost a terminating end (right end) D4 of the pixel position. Since image data of the scanning line K+1 corresponds to 50% density, and right growth is set for the scanning line K+1, laser irradiation is performed from almost the intermediate point C of the pixel position to the right end D4 of the pixel position.

A region $R_{K-1}$ represents the region of a latent image to be formed by the laser irradiation $L_{K-1}$. A region $R_K$ represents the region of a latent image to be formed by the laser irradiation $L_K$. A region $R_{K+1}$ represent the region of a latent image to be formed by the laser irradiation $L_{K+1}$.

Figure 11B:
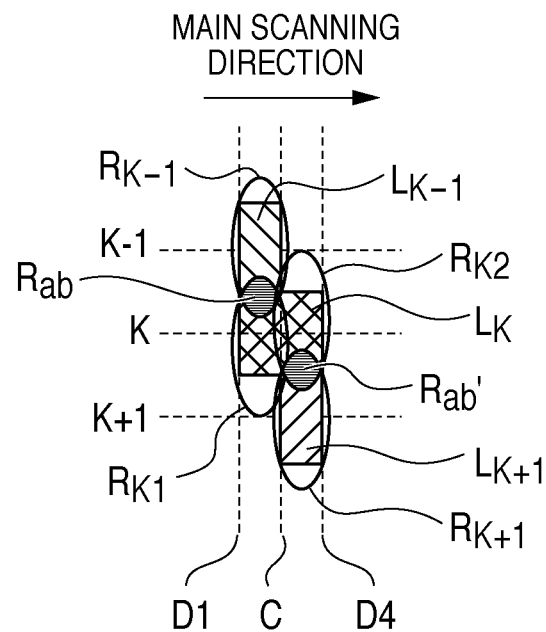

The latent image in the region $R_K$ shown in FIG. 11A is divided into regions $R_{K1}$ and $R_{K2}$, as shown in FIG. 11B. The latent image in the region $R_{K-1}$ and that in the region $R_{K1}$ shown in FIG. 11B are composited to form a toner image T1 shown in FIG. 11C. Similarly, the latent image in the region $R_{K+1}$ and that in the region $R_{K2}$ shown in FIG. 11B are composited to form a toner image T2 shown in FIG. 11C. The toner images T1 and T2 are composited to form a dot E that forms a line of 2-dot width shown in FIG. 11D.

In the thus generated toner images T1 and T2, the portions with excess toner (overlap regions Rab and Rab' shown in FIG. 11B) are small, and toner scattering or extension of line width hardly occurs upon transfer. As a result, extension of width of a line generated by the formed dot E can be reduced or prevented, as shown in FIG. 11D.

[Reason why Line Width is not Extended]

The reason why the line width is not extended will be examined below from the viewpoint of density.

Figure 11C:
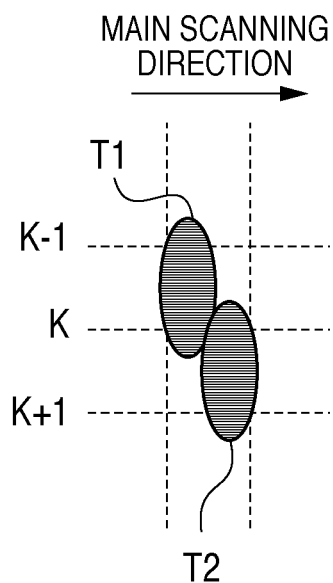
Figure 11D:
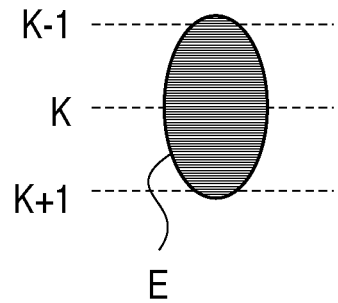

The toner image T1 shown in FIG. 11C is formed by compositing the latent image in the region $R_{K-1}$ and that in the region $R_{K1}$ shown in FIG. 11B. Hence, the latent image of the toner image T1 is formed by compositing the laser irradiation $L_{K-1}$ and the laser irradiation $L_K$ within the range from the position D1 to the position C. That is, $Pi_{K-1}=50\%$ is added to $Pi_K/2=50\%$, thereby obtaining 100% as the density of the toner image T1.

Similarly, the toner image T2 is formed by compositing the latent image in the region $R_{K2}$ and that in the region $R_{K+1}$. Hence, the latent image of the toner image T2 is formed by compositing the laser irradiation $L_{K+1}$ and the laser irradiation $L_K$ within the range from the position C to the position D4. That is, $Pi_{K+1}=50\%$ is added to $Pi_K/2=50\%$, thereby obtaining 100% as the density of the toner image T2. That is, each of the toner images T1 and T2 is a dot of 100% density, which is shifted by a ½ pixel in the sub-scanning direction and has a ½ dot width in the main scanning direction. Hence, the density of the dot E shown in FIG. 11D formed by compositing the toner images T1 and T2 is not 200% corresponding to the sum of the densities of the toner images T1 and T2 but 100%. As a result, width of the line formed by the dot E is not extended.

An example has been described above in which a line of 2-dot width is formed. For a line whose width is more than 2 dots as well, extension of the line width can be reduced or prevented by generating directional data so as to change the dot growing direction between the upper and lower ends of the line in the widthwise direction. For example, directional data for a line of 3-dot width has a growing pattern "right growth, right growth, right growth, left growth, left growth, left growth, right growth, . . . " for each scanning line. That is, the directional data changes the growing direction at a cycle (scanning line cycle) of three scanning lines.

As described above, when correcting banding caused by pitch fluctuation by controlling the dot formation position, extension of the width of a line having a width of 2 dots or more can be reduced or prevented.

Second Embodiment

An image processing apparatus and image processing method according to the second embodiment of the present invention will be described below. Note that the same reference numerals as in the first embodiment denote the same parts in the second embodiment, and a detailed description thereof will not be repeated.

Figure 12:
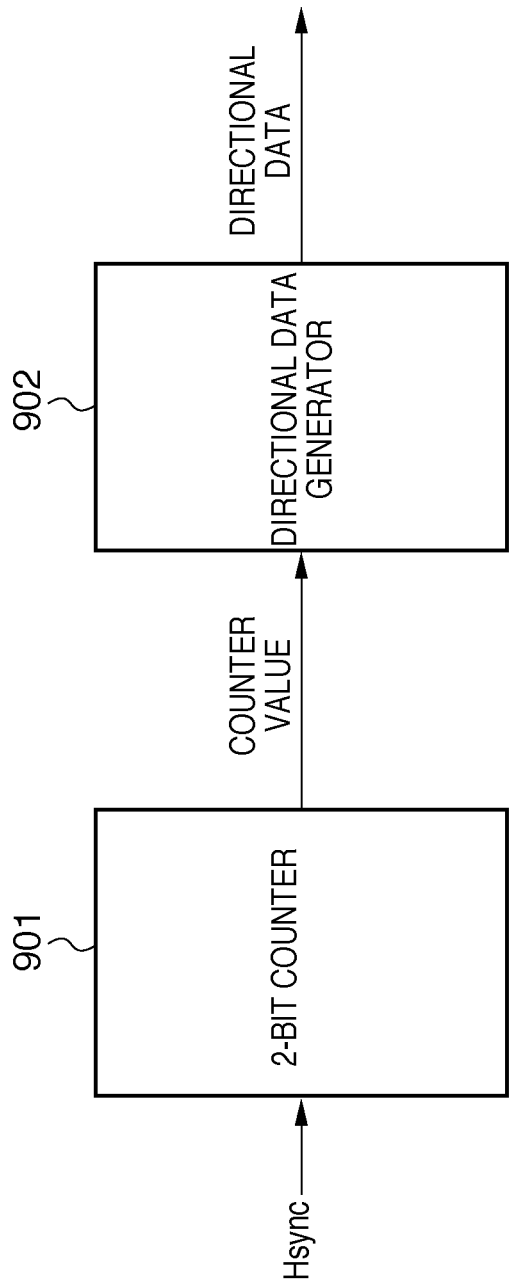
FIG. 12 is a block diagram for explaining the arrangement of a directional data generator according to the second embodiment.

The second embodiment has the same arrangement as that of the first embodiment except for the arrangement of a directional data generator 105. The directional data generator 105 of the second embodiment will be described below. The arrangement of the directional data generator 105 of the second embodiment will be described with reference to the block diagram of FIG. 12.

A 2-bit counter 901 is a line counter that counts a horizontal sync signal Hsync, and counts up for every scanning line. Upon counting up from "11", the count value returns to "00".

A directional data generator 902 generates directional data based on the most significant bit (MSB) of the counter value output from the 2-bit counter 901. For example, when the MSB is "0", the directional data generator 902 generates directional data representing right growth. When the MSB is "1", the directional data generator 902 generates directional data representing left growth. The MSB repeats "0" and "1" every two scanning lines. For this reason, the directional data output from the directional data generator 902 repeats directional data representing right growth and that representing left growth every two scanning lines.

When repeating every N scanning lines (N=4 in the example of FIG. 10), an N-ary counter is used in place of the 2-bit counter 901. Especially when N is a power of 2, directional data is generated from the M lower bits (M=$\log_2$N) of the line counter.

As described above, using a line counter enables the generation of directional data without requiring a memory for storing directional data.

Third Embodiment

An image processing apparatus and image processing method according to the third embodiment of the present invention will be described below. Note that the same reference numerals as in the first and second embodiments denote the same parts in the third embodiment, and a detailed description thereof will not be repeated.

Figure 13:
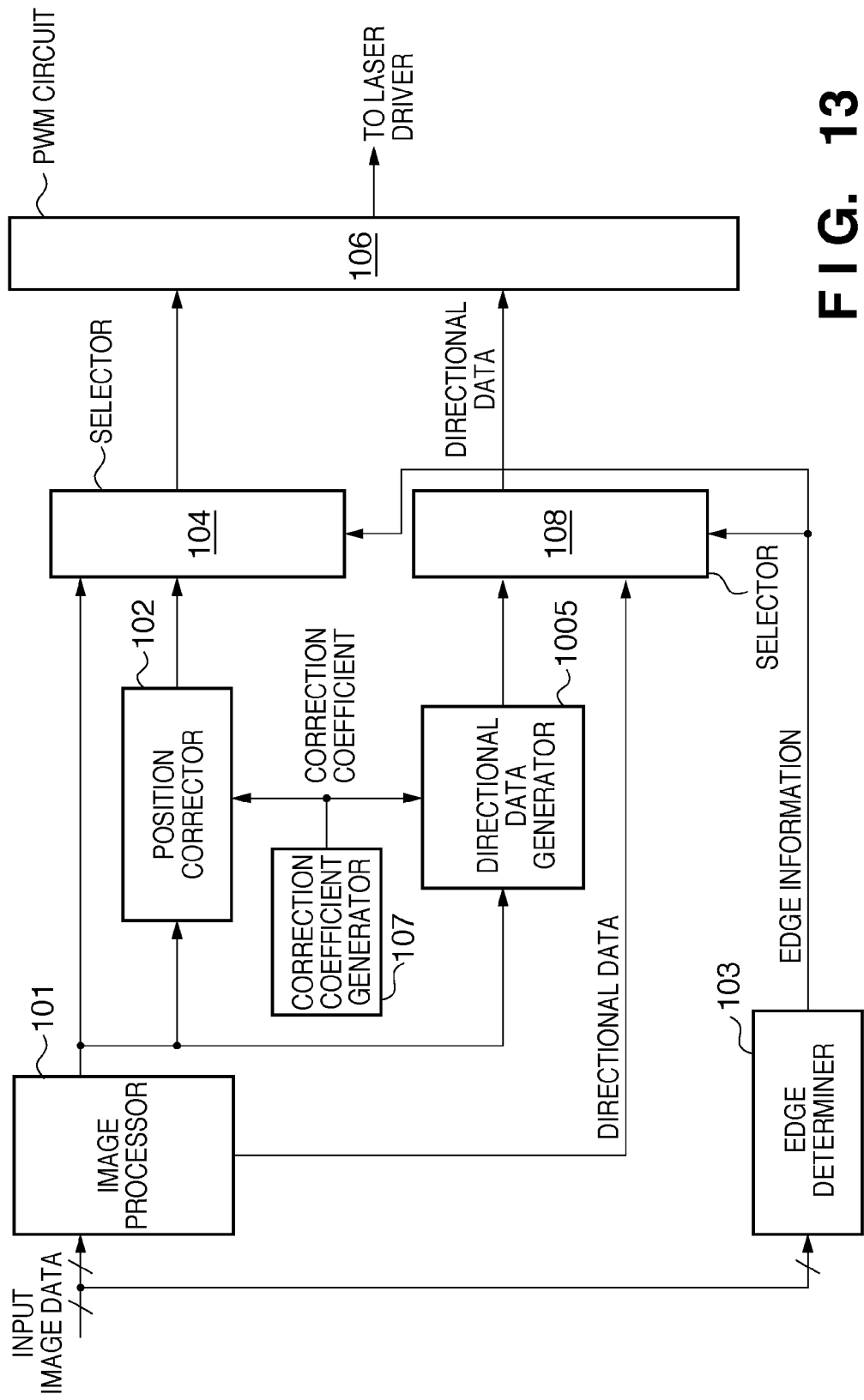
FIG. 13 is a block diagram for explaining the arrangement of an image processing apparatus according to the third embodiment.

The arrangement of the image processing apparatus according to the third embodiment will be described with reference to the block diagram of FIG. 13. A directional data generator 1005 is different from the first embodiment, and details of the directional data generator 1005 will be explained below.

The directional data generator 1005 receives image data $Pi_{K-1}$, $Pi_K$, and $Pi_{K+1}$ output from an image processor 101. Note that the image data $Pi_K$ is the image data of a pixel of interest of a scanning line K of interest. The directional data generator 1005 also receives correction coefficients $Cc_{K-1}$, $Cc_K$, and $Cc_{K+1}$ corresponding to the scanning lines.

As described above, to prevent extension of the width of a line having a width of 2 dots or more, directional data is generated so as to change the dot growing direction between the upper and lower ends of the line in the widthwise direction. The directional data generator 1005 determines, based on the image data $Pi_{K-1}$, $Pi_K$, and $Pi_{K+1}$ and the correction coefficients $Cc_{K-1}$, $Cc_K$, and $Cc_{K+1}$, whether the pixel of interest is located at the upper or lower end of the line in the widthwise direction, and generates directional data in accordance with the determination result. The determination method and directional data generation according to the determination result will be described below. The upper or lower end of a line in the widthwise direction will sometimes simply be expressed as "upper end of a line", "lower end of a line", or "upper and lower ends of a line".

When Pixel of Interest is Located at Upper End of Line

When a first condition that the image data $Pi_{K-1}$=0, $Pi_K$>0, and $Pi_{K+1}$>0, and the correction coefficient $Cc_K$>0 is satisfied, the pixel of interest is located at the upper end of the line.

When a second condition that the image data $Pi_K$=0 and $Pi_{K+1}$>0, and the correction coefficient $Cc_{K+1}$<0 is satisfied, the pixel of interest is located at the upper end of the line. When the first or second condition is satisfied, the directional data generator 1005 determines that the pixel of interest is located at the upper end of the line, and outputs directional data representing, for example, left growth.

When Pixel of Interest is Located at Lower End of Line

When a third condition that the image data $Pi_{K-1}$>0, $Pi_K$>0, and $Pi_{K+1}$=0, and the correction coefficient $Cc_K$<0 is satisfied, the pixel of interest is located at the lower end of the line. When a fourth condition that the image data $Pi_{K-1}$>0 and $Pi_K$=0, and the correction coefficient $Cc_{K-1}$>0 is satisfied, the pixel of interest is located at the lower end of the line. When the third or fourth condition is satisfied, the directional data generator 1005 determines that the pixel of interest is located at the lower end of the line, and outputs directional data representing a growing direction reverse to that of the upper end (right growth in this example).

When Pixel of Interest is Located at Neither Upper End Nor Lower End of Line

If none of the first to fourth conditions is satisfied, the directional data generator 1005 determines that the pixel of interest is located at neither the upper end nor the lower end of the line, or the line to be formed does not have a width of 2 dots or more. In this case, the directional data generator 1005 outputs predetermined directional data representing, for example, growth from the center.

As described above, it is possible to determine, based on whether image data is 0, and the sign of the correction coefficient Cc, whether the pixel of interest is located at the upper or lower end of the line, and thus set different growing directions for the upper and lower ends of the line.

Figure 14A:
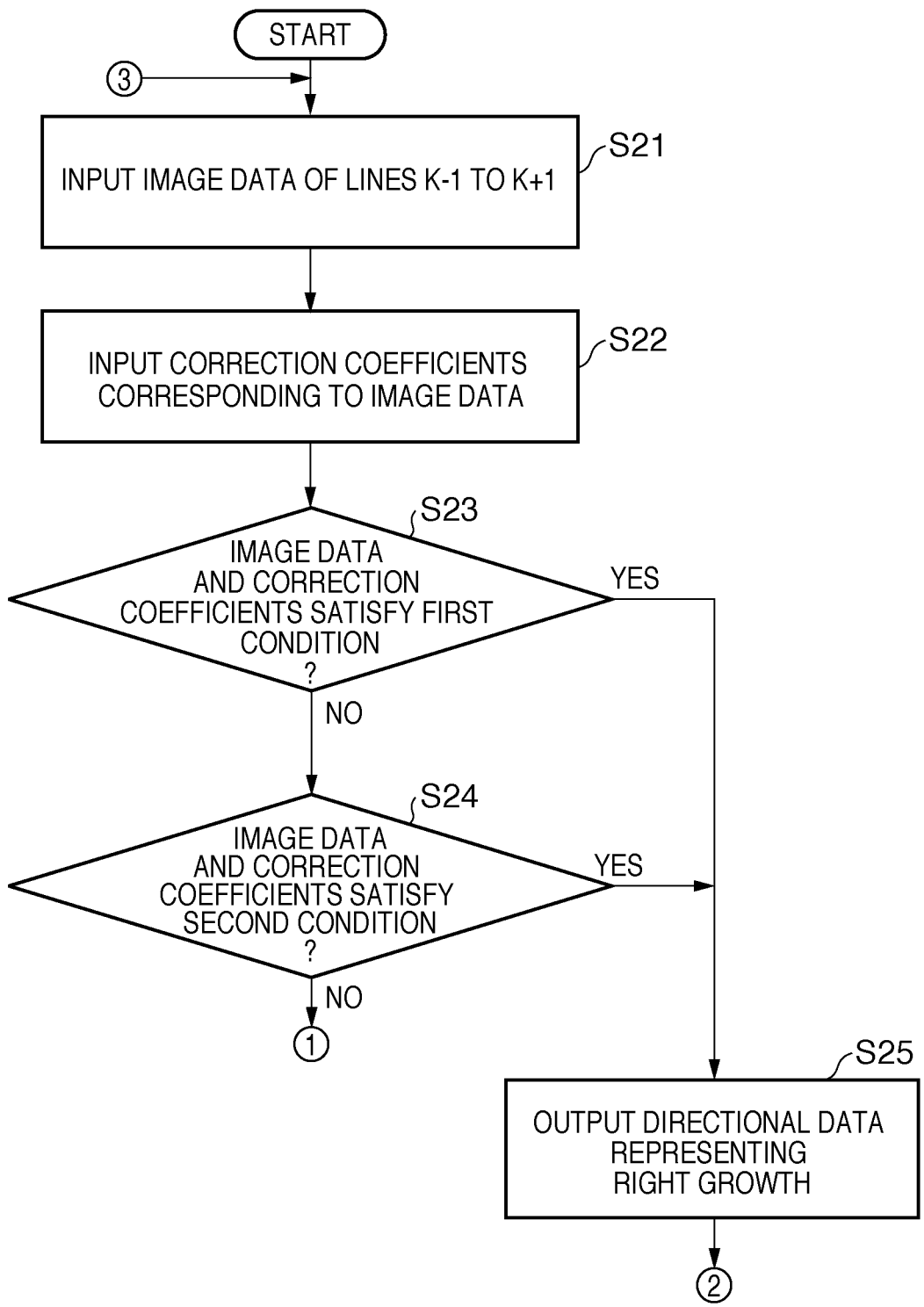
FIGS. 14A and 14B comprise a flowchart for explaining processing of the directional data generator.
Figure 14B:
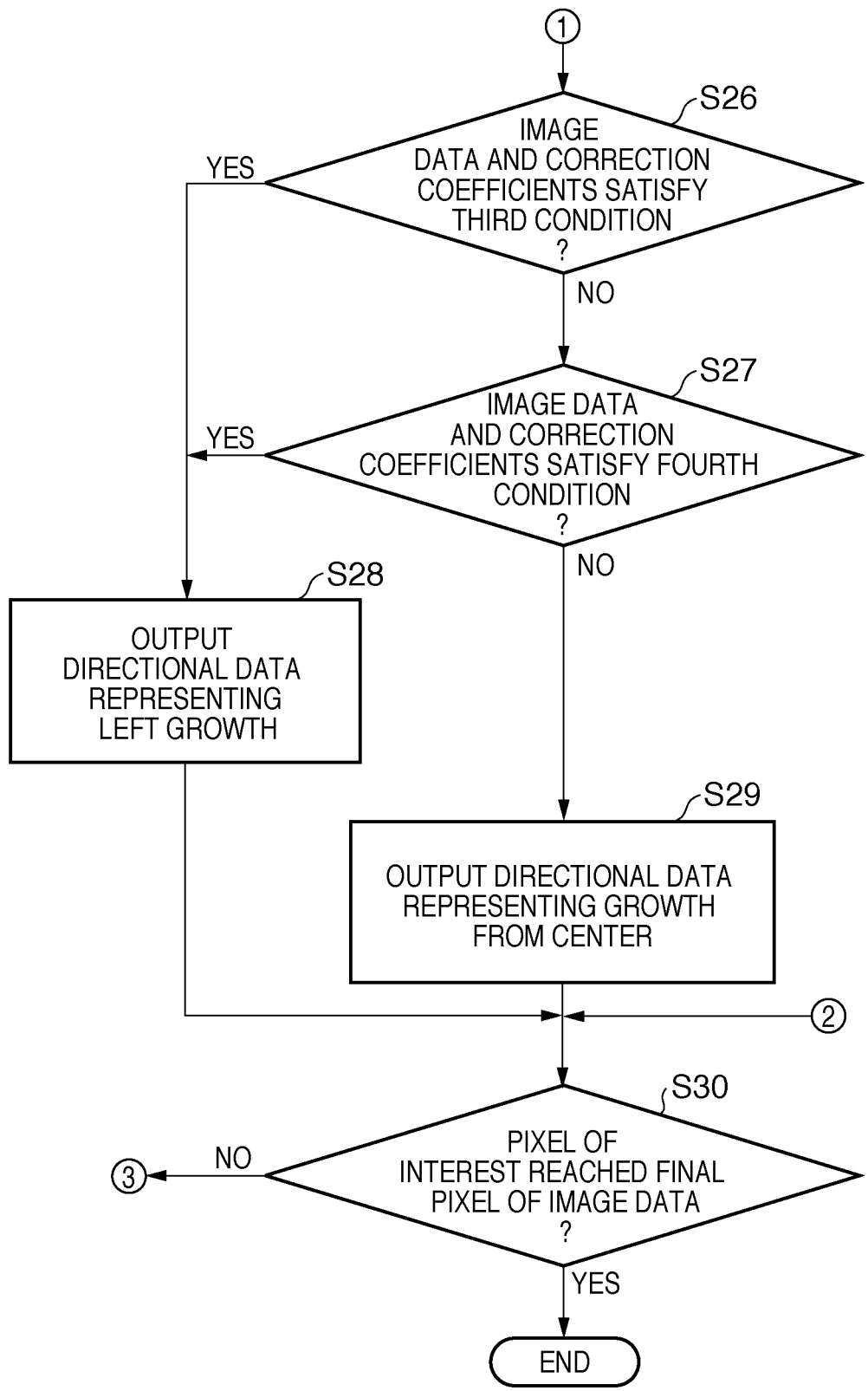

Processing of the directional data generator 1005 will be described with reference to the flowchart of FIGS. 14A and 14B.

The directional data generator 1005 receives image data of the scanning lines K−1 to K+1 output from the image processor 101 (S21). The directional data generator 1005 also receives the correction coefficients $Cc_{K-1}$, $Cc_K$, and $Cc_{K+1}$ corresponding to the image data from a correction coefficient generator 107 (S22).

The directional data generator 1005 determines whether the image data and the correction coefficients satisfy the first condition (S23), and whether they satisfy the second condition (S24). If the first or second condition is satisfied, the directional data generator 1005 outputs directional data representing, for example, right growth (S25), and advances the process to step S30.

If neither of the first and second conditions is satisfied, the directional data generator 1005 determines whether the image data and the correction coefficients satisfy the third condition (S26), and whether they satisfy the fourth condition (S27). If the third or fourth condition is satisfied, the directional data generator 1005 outputs directional data representing, for example, left growth (S28), and advances the process to step S30.

If none of the first to fourth conditions is satisfied, the directional data generator 1005 outputs directional data representing, for example, growth from the center (S29), and advances the process to step S30. Until it is determined in step S30 that the pixel of interest has reached the final pixel of the image data, the directional data generator 1005 repeats steps S21 to S29.

As described above, when the pixel of interest is located at the upper end of a line corresponding to an edge portion of the line, directional data representing a first growing direction can be generated. When the pixel of interest is located at the lower end of a line corresponding to an edge portion of the line, directional data representing a second growing direction reverse to the first growing direction can be generated. For a flat portion of the line other than the upper and lower ends of the line, directional data representing, for example, growth for the center can be generated. Note that a dot in the flat portion need not always grow from the center, and any other growing direction can be set.

Modification of Third Embodiment

Figure 15:
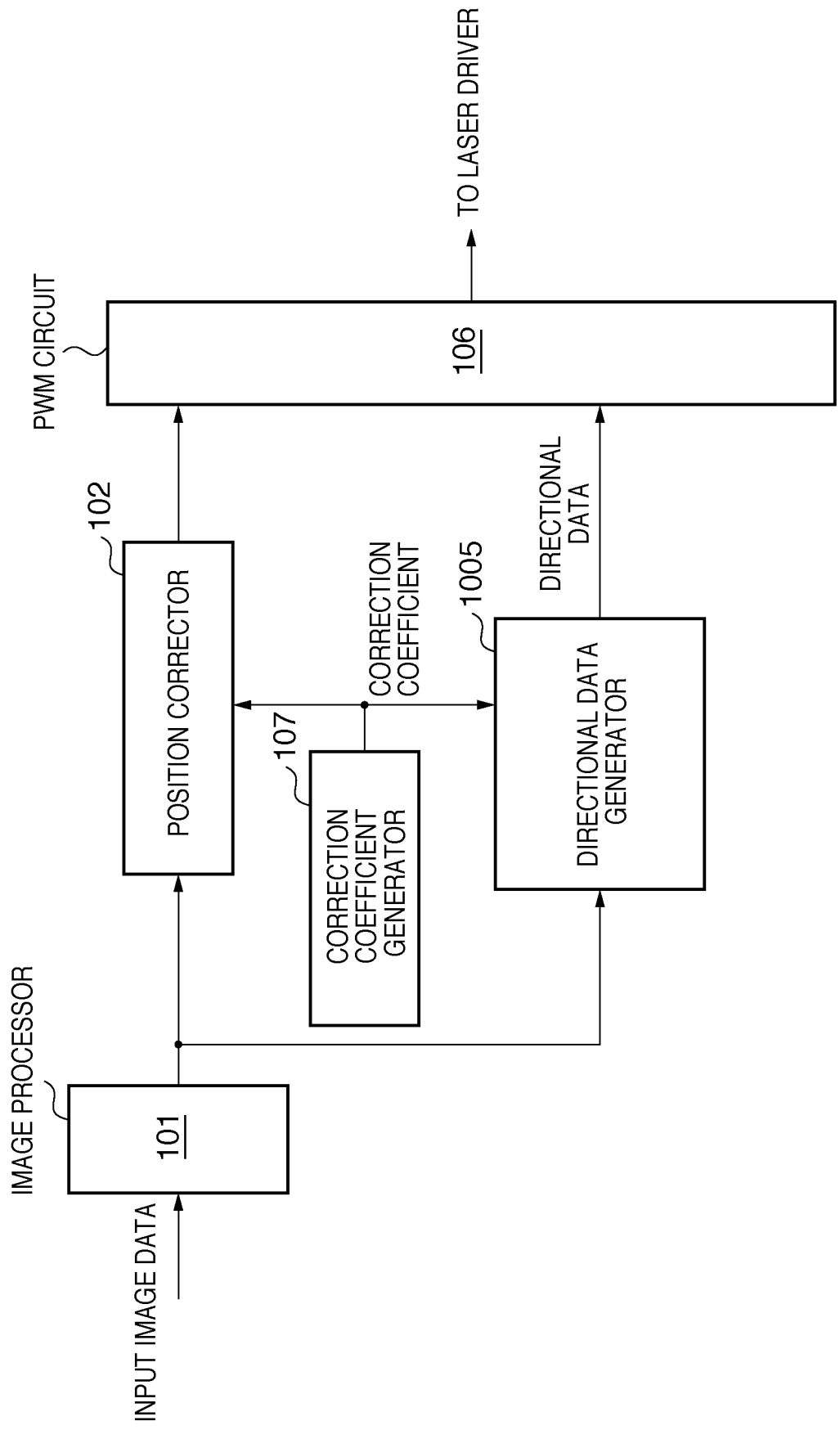
FIG. 15 is a block diagram for explaining the arrangement of an image processing apparatus according to a modification.

The arrangement of an image processing apparatus according to a modification will be described with reference to the block diagram of FIG. 15.

The directional data generator 1005 generates directional data from image data of three pixels adjacent in the sub-scanning direction and the signs of correction coefficients corresponding to the image data. Directional data generated by the directional data generator 1005 represents left growth or right growth for an edge portion of a line in the widthwise direction, or a predetermined growing direction (for example, growth from the center) for a flat portion of a line. Hence, if the growing direction set in the image processor 101 is the predetermined growing direction, an edge determiner 103 and selectors 104 and 108 can be removed from the arrangement shown in FIG. 13 to constitute an image processing apparatus in a smaller circuit scale.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-261320, filed Nov. 16, 2009, which is hereby incorporated by reference herein in its entirety.

What is claimed is:

1. An image processing apparatus for outputting an image signal to an image forming device which uses an electrophotographic method, comprising:
   a generator, configured to generate directional data representing a pattern which indicates a growing direction of a dot on a scanning line and in which the growing direction changes every predetermined number of scanning lines;
   a setting section, configured to set correction coefficients to be used to distribute image data of a pixel of interest to the pixel of interest and an adjacent pixel adjacent to the pixel of interest in a sub-scanning direction;
   a detector, configured to detect an edge portion of an image represented by input image data;
   a distributor, configured to distribute the image data of the pixel of interest of the input image data to the pixel of interest and the adjacent pixel in accordance with the correction coefficients;
   a corrector, configured to add image data distributed from the adjacent pixel to image data of the pixel of interest on which the distribution is performed, and to output the added image data as corrected image data of the pixel of interest;
   an selector, configured to select the corrected image data of the pixel of interest and the generated directional data for an edge portion of the image, and to select the image data of the pixel of interest and input directional data supplied together with the input image data for a non-edge portion of the image; and
   a pulse-width modulator, configured to generate an image signal pulse-width modulated using the image data of the pixel of interest and the directional data selected by said selector, and to output the pulse-width modulated image signal to the image forming device.

2. The apparatus according to claim 1, wherein said generator generates directional data representing a pattern in which the growing direction of a scanning line corresponding to an upper end in a widthwise direction of a line formed by the image forming device and the growing direction of a scanning line corresponding to a lower end in a widthwise direction of a line formed by the image forming device are different.

3. The apparatus according to claim 1, further comprising a halftone processor configured to perform a halftone-process on the input image data before the distribution and selection performed, respectively, by the distributor and the selector,
   wherein said halftone processor outputs the input directional data together with the halftone-processed image data.

4. The apparatus according to claim 1,
   wherein, when image data of an adjacent pixel of an immediately preceding scanning line of a scanning line of interest on which the pixel of interest exists has a value of 0, the value of the image data of the pixel of interest exceeds 0, image data of the adjacent pixel of the immediately succeeding scanning line of the scanning line of interest has a value that exceeds 0, and at least one of the correction coefficients represents the distribution to the adjacent pixel of the succeeding scanning line, said generator generates directional data representing a first growing direction,
   wherein, when the image data of the pixel of interest has a value of 0, the image data of the adjacent pixel of the succeeding scanning line has a value that exceeds 0, and at least one of the correction coefficients represents the distribution to the adjacent pixel of the preceding scanning line, said generator generates directional data representing the first growing direction,
   wherein, when the image data of the adjacent pixel of the preceding scanning line and the image data of the pixel of interest have a value that exceed 0, the image data of the adjacent pixel of the succeeding scanning line has a value of 0, and at least one of the correction coefficients represents the distribution to the adjacent pixel of the preceding scanning line, said generator generates directional data representing a second growing direction reverse to the first growing direction, and
   wherein, when the image data of the adjacent pixel of the preceding scanning line has a value that exceeds 0, the image data of the pixel of interest has a value of 0, and at least one of the correction coefficients represents the distribution to the adjacent pixel of the succeeding scanning line, said generator generates directional data representing the second growing direction.

5. An image processing method of outputting an image signal to an image forming device which uses an electrophotographic method, the image processing method comprising:
using a processor to perform the steps of:
generating directional data representing a pattern which indicates a growing direction of a dot on a scanning line and in which the growing direction changes every predetermined number of scanning lines;
setting correction coefficients to be used to distribute image data of a pixel of interest to the pixel of interest and an adjacent pixel adjacent to the pixel of interest in a sub-scanning direction;
detecting an edge portion of an image represented by input image data;
distributing the image data of the pixel of interest of the input image data to the pixel of interest and the adjacent pixel in accordance with the correction coefficients;
adding the image data distributed from the adjacent pixel to image data of the pixel of interest on which the distribution is performed, and outputting the added image data as corrected image data of the pixel of interest;
selecting the corrected image data of the pixel of interest and the generated directional data for an edge portion of the image, and selecting the image data of the pixel of interest and input directional data supplied together with the input image data for a non-edge portion of the image;
generating an image signal pulse-width modulated using the image data of the pixel of interest and the directional data selected in the selecting step; and
outputting the pulse-width modulated image signal to the image forming device.

6. A non-transitory computer readable medium storing a computer-executable program for causing a computer to perform an image processing method of outputting an image signal to an image forming device which uses an electrophotographic method, the image processing method comprising the steps of:
generating directional data representing a pattern which indicates a growing direction of a dot on a scanning line and in which the growing direction changes every predetermined number of scanning lines;
setting correction coefficients to be used to distribute image data of a pixel of interest to the pixel of interest and an adjacent pixel adjacent to the pixel of interest in a sub-scanning direction;
detecting an edge portion of an image represented by input image data;
distributing the image data of the pixel of interest of the input image data to the pixel of interest and the adjacent pixel in accordance with the correction coefficients;
adding the image data distributed from the adjacent pixel to image data of the pixel of interest on which the distribution is performed, and outputting the added image data as corrected image data of the pixel of interest;
selecting the corrected image data of the pixel of interest and the generated directional data for an edge portion of the image, and selecting the image data of the pixel of interest and input directional data supplied together with the input image data for a non-edge portion of the image;
generating an image signal pulse-width modulated using the image data of the pixel of interest and the directional data selected in the selecting step; and
outputting the pulse-width modulated image signal to the image forming device.

7. An image processing apparatus for outputting an image signal to an image forming device which uses an electrophotographic method, the apparatus comprising:
a detector configured to detect an edge of an image represented by input image data in a main scanning direction of the image forming device so as to detect a line contained in the input image data;
a distributor configured to distribute a pixel value of a pixel of interest, which is in the edge detected by the detector, of the input image data to the pixel of interest and an adjacent pixel adjacent to the pixel of interest in a sub-scanning direction of the image forming device so as to correct pixel values of the pixel of interest and the adjacent pixel;
an acquisition unit configured to acquire a dot growing direction for each scanning line in the main scanning direction; and
a generator configured to generate, for each pixel, an image signal pulse-width modulated from a pixel value corrected by the distributor or a pixel value of the input image data in accordance with the dot growing direction,
wherein the dot growing direction in the scanning line corresponding to an upper end of the edge is different from the dot growing direction in the scanning line corresponding to a lower end of the edge.

8. The apparatus according to claim 7, further comprising a ratio acquisition unit configured to acquire a distribution ratio for each scanning line in the main scanning direction, wherein the image is to be formed by the image forming device, and wherein the distribution ratio is set to correct a positional deviation in the sub-scanning direction of the image to be formed by the image forming device, and the distributor performs the distribution of the pixel value in accordance with the distribution ratio.

9. The apparatus according to claim 7, wherein the dot growing direction changes with a period of N scanning lines when the edge corresponds to a line of N pixel width, where N is an positive integer.

10. The apparatus according to claim 9, wherein N is 2.

11. The apparatus according to claim 7, wherein the dot growing direction in the scanning line corresponding to the upper end of the edge or the lower end of the edge is right growth, and the dot growing direction in the other scanning line is left growth.

12. The apparatus according to claim 7, wherein a dot that is part of the line except the upper end and the lower end of the edge, is grown from a center of a pixel position.

13. The apparatus according to claim 8, wherein the ratio acquisition unit acquires distribution ratios of a number of scanning lines corresponding to a period of the positional deviation in the sub-scanning direction of the image to be formed by the image forming device.

14. The apparatus according to claim 7, wherein the acquisition unit acquires the dot growing direction using a line counter.

15. An image processing apparatus for outputting an image signal to an image forming device which uses an electrophotographic method, the apparatus comprising:
an acquisition unit configured to acquire a distribution ratio for each scanning line in a main scanning direction of the image forming device, wherein the distribution ratio is set to correct a positional deviation in a sub-scanning direction of an image to be formed by the image forming device;
a distributor configured to distribute a pixel value of a pixel of interest of input image data to the pixel of interest and a pixel adjacent to the pixel of interest in the sub-scanning direction based on the distribution ratio;

a setting unit configured to set a dot growing direction for each scanning line in the main scanning direction; and a generator configured to generate an image signal pulse-width modulated from image data obtained as a distribution result by the distributor in accordance with the dot growing direction, wherein a pixel $P_{K-1}$ on a scanning line K−1, a pixel $P_K$ on a scanning line K, and a pixel $P_{K+1}$ on a scanning line K+1 are located in the same position in the main scanning direction, and the growing direction of the pixel $P_{K-1}$ is different from that of the pixel $P_{K+1}$.

16. An image processing method of outputting an image signal to an image forming device which uses an electrophotographic method, the method comprising:

using a processor to perform the steps of:

detecting an edge of an image represented by input image data in a main scanning direction of the image forming device so as to detect a line contained in the input image data;

distributing a pixel value of a pixel of interest, which is in the edge detected in the detecting step, of the input image data to the pixel of interest and an adjacent pixel adjacent to the pixel of interest in a sub-scanning direction of the image forming device so as to correct pixel values of the pixel of interest and the adjacent pixel;

acquiring a dot growing direction for each scanning line in the main scanning direction; and generating, for each pixel, an image signal pulse-width modulated from a pixel value corrected in the distributing step or a pixel value of the input image data in accordance with the dot growing direction, wherein the dot growing direction in the scanning line corresponding to an upper end of the edge is different from the dot growing direction in the scanning line corresponding to a lower end of the edge.

17. An image processing method of outputting an image signal to an image forming device which uses an electrophotographic method, the method comprising:

using a processor to perform the steps of:

acquiring a distribution ratio for each scanning line in a main scanning direction of the image forming device, wherein the distribution ratio is set to correct a positional deviation in a sub-scanning direction of the image forming device;

distributing a pixel value of a pixel of interest of input image data to the pixel of interest and an adjacent pixel adjacent to the pixel of interest in the sub-scanning direction based on the distribution ratio;

setting a dot growing direction for each scanning line in the main scanning direction; and generating an image signal pulse-width modulated from image data obtained as a distribution result in the distributing step in accordance with the dot growing direction, wherein a pixel $P_{K-1}$ on a scanning line K−1, a pixel $P_K$ on a scanning line K, and a pixel $P_{K+1}$ on a scanning line K+1 are located in the same position in the main scanning direction, and the growing direction of the pixel $P_{K-1}$ is different from that of the pixel $P_{K+1}$.

18. A non-transitory computer readable medium storing a computer-executable program for causing a computer to perform an image processing method of outputting an image signal to an image forming device which uses an electrophotographic method, the method comprising the steps of:

detecting an edge of an image represented by input image data in a main scanning direction of the image forming device so as to detect a line contained in the input image data;

distributing a pixel value of a pixel of interest, which is in the edge detected in the detecting step, of the input image data to the pixel of interest and an adjacent pixel adjacent to the pixel of interest in a sub-scanning direction of the image forming device so as to correct pixel values of the pixel of interest and the adjacent pixel;

acquiring a dot growing direction for each scanning line in the main scanning direction; and generating, for each pixel, an image signal pulse-width modulated from a pixel value corrected in the distributing step or a pixel value of the input image data in accordance with the dot growing direction, wherein the dot growing direction in the scanning line corresponding to an upper end of the edge is different from the dot growing direction in the scanning line corresponding to a lower end of the edge.

19. A non-transitory computer readable medium storing a computer-executable program for causing a computer to perform an image processing method of outputting an image signal to an image forming device which uses an electrophotographic method, the method comprising the steps of:

acquiring a distribution ratio for each scanning line in a main scanning direction of the image forming device, wherein the distribution ratio is set to correct positional deviation in a sub-scanning direction of the image forming device;

distributing a pixel value of a pixel of interest of input image data to the pixel of interest and an adjacent pixel adjacent to the pixel of interest in the sub-scanning direction based on the distribution ratio;

setting a dot growing direction for each scanning line in the main scanning direction; and generating an image signal pulse-width modulated from image data obtained as a distribution result in the distributing step in accordance with the dot growing direction, wherein a pixel $P_K$, on a scanning line K−1, a pixel $P_K$ on a scanning line K, and a pixel $P_{K+1}$ on a scanning line K+1 are located in the same position in the main scanning direction, and the growing direction of the pixel $P_{K-1}$ is different from that of the pixel $P_{K+1}$.

* * * * *